United States Patent [19]
Baumann

[11] Patent Number: 6,104,922
[45] Date of Patent: Aug. 15, 2000

[54] USER AUTHENTICATION IN A COMMUNICATION SYSTEM UTILIZING BIOMETRIC INFORMATION

[75] Inventor: William John Baumann, Tempe, Ariz.

[73] Assignee: Motorola, Inc., Schaumburg, Ill.

[21] Appl. No.: 09/033,417

[22] Filed: Mar. 2, 1998

[51] Int. Cl.[7] .................................................. H04M 1/68
[52] U.S. Cl. ........................ 455/410; 455/411; 455/550
[58] Field of Search .................... 455/410, 411, 455/550, 557; 436/13.1, 428, 427, 430

[56] References Cited

U.S. PATENT DOCUMENTS

| | | | |
|---|---|---|---|
| 5,005,210 | 4/1991 | Ferrell | 455/115 |
| 5,229,764 | 7/1993 | Matcgett et al. | 340/825.34 |
| 5,335,278 | 8/1994 | Matchett et al. | 380/23 |
| 5,414,755 | 5/1995 | Bahler et al. | 379/67 |
| 5,465,290 | 11/1995 | Hampton et al. | 379/67 |
| 5,469,506 | 11/1995 | Berson et al. | 380/23 |
| 5,555,551 | 9/1996 | Rudokas et al. | 379/59 |
| 5,872,834 | 2/1999 | Teiltelbaum | 379/93.03 |
| 5,889,474 | 3/1999 | LaDue | 340/825.49 |
| 5,893,031 | 4/1999 | Hoogerwerf et al. | 455/410 |
| 5,940,751 | 8/1999 | Kaplan et al. | 455/411 |

*Primary Examiner*—Edward F. Urban
*Assistant Examiner*—Tilahun Gesesse
*Attorney, Agent, or Firm*—Dana B. LeMoine; Timothy J. Lorenz

[57] ABSTRACT

A method and apparatus for authenticating subscriber units (30) and users (25) in a communications system includes a communications node (200) which receives biometric information describing a user (25), and measures an RF signature of the subscriber unit (30). The biometric information and RF signature are compared against a valid user profile to determine authenticity of the user (25) and the subscriber unit (30). The biometric information can include retinal scan data, fingerprint data, or other data. The RF signature can include spectral content, phase or frequency characteristics, or other identifying features.

14 Claims, 5 Drawing Sheets

6,104,922

USER AUTHENTICATION IN A COMMUNICATION SYSTEM UTILIZING BIOMETRIC INFORMATION

FIELD OF THE INVENTION

This invention relates in general to the detection of fraudulent use of communications systems and, in particular, to fraudulent access by mobile users.

BACKGROUND OF THE INVENTION

Fraudulent access of cellular telephone systems is costly. Service providers lose money every year due to pirates accessing systems with stolen phones, and due to pirates using fraudulent equipment made to operate like legitimate phones.

Current techniques used in the art to detect fraudulent use include evaluating call patterns, called numbers, locations from which calls are placed, etc., and making comparisons against a user's historical activity. When anomalous behavior is recorded, fraudulent use is suspected. This allows service providers to detect fraudulent use only as a result of a change in a user's calling behavior, and while useful, is not very robust. If stolen phones stay in the area of their normal use, their pirated use may not be detected. Likewise, if fraudulent equipment that mimics a particular phone is used in the area normally occupied by the legitimate user, the pirated use may not be detected.

It would be desirable to robustly detect both types of pirated use outlined above. That is, it would be useful to detect either a pirate with a stolen phone, or the use of fraudulent equipment. What is needed is a method and apparatus for authenticating a particular cellular telephone, and verifying that it is being used by a valid user for that telephone.

DETAILED DESCRIPTION OF THE DRAWINGS

Figure 1:
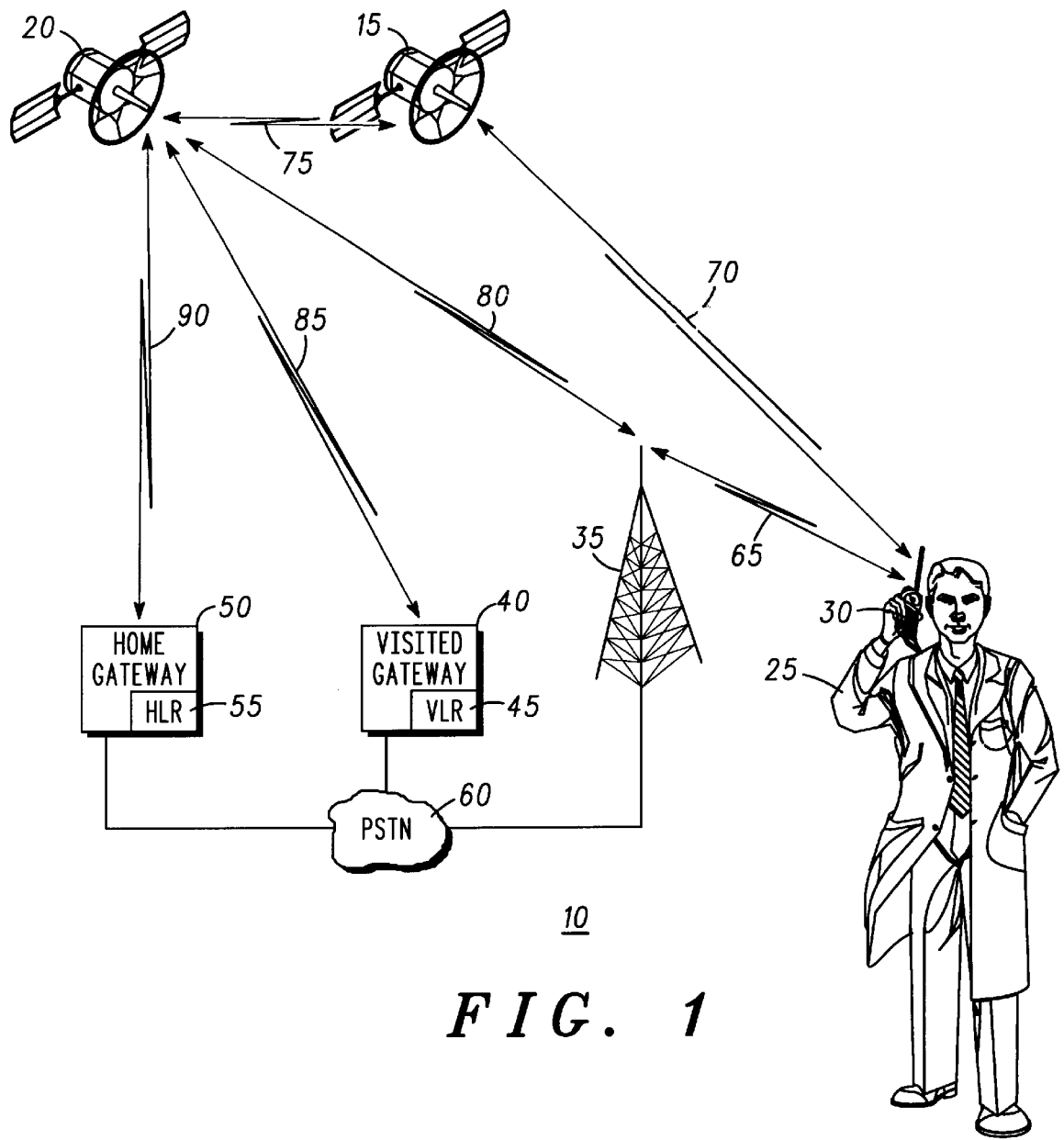
FIG. 1 shows a diagram of a communications system in accordance with a preferred embodiment of the present invention.

Turning now to the drawings in which like reference characters indicate corresponding elements throughout the several views, attention is first directed to FIG. 1. FIG. 1 shows a diagram of a communications system in accordance with a preferred embodiment of the present invention. Communications system 10 includes satellite 15, satellite 20, home gateway(HGW) 50, visiting gateway(VGW) 40, base station 35, and public switched telephone network (PSTN) 60. Also shown in communications system 10 are communications links 65, 70, 75, 80, 85, and 90, and user 25 with subscriber unit 30.

Satellites 15 and 20 are preferably low earth orbit (LEO) satellites, but this is not a limitation of the present invention. In a preferred embodiment, satellites 15 and 20 are part of a larger constellation of LEO satellites. In addition, the functionality of satellites 15 and 20 can be combined into a single satellite while still practicing the present invention. For example, communications system 10 could include one or more geostationary orbit (GSO) satellites that provide the functionality of satellites 15 and 20.

HGW 50, VGW 40, and base station 35 communicate with satellite 20 via communication links 90, 85, and 80, respectively, as shown in FIG. 1. The satellites, in turn, communicate with mobile user 25 via communication link 70. The communication links in the exemplary embodiment of FIG. 1 show the gateways communicating with a single satellite and a single satellite communicating with a single mobile user. In a preferred embodiment, base station 35, HGW 50, and VGW 40 each communicate with multiple satellites, possibly simultaneously, and each satellite communicates with multiple mobile users. FIG. 1 shows that for mobile user 25 to communicate with HGW 50, the communication link includes two satellites. In another valid configuration of the network, the link between mobile user 25 and HGW 70 includes three or more satellites, and in still another valid configuration, only one satellite is needed. Multiple valid configurations also exist in the link between mobile user 25 and base station 35, and between mobile user 25 and VGW 40.

One of many functions performed by base station 35, HGW 50, and VGW 40 is to network the communications system with PSTN 60. When a call is placed through a satellite by mobile user 25, the call is routed through the satellites to a gateway, and if the call is destined for a user in PSTN 60, the gateway routes the call to PSTN 60. If, on the other hand, the call is destined for another user within communications system 10, the call may never be routed to PSTN 60. Base station 35, HGW 50, and VGW 40 can communicate using terrestrial links or using satellite communication links such as the path created by links 80, 85, and 90.

Subscriber unit 30 is typically a cellular telephone, but this is not a limitation of the present invention. Subscriber unit 30 can also be a data device, such as a modem, or any other device capable of transmitting into communications system 10. Subscriber unit 30 can also be for use exclusively with terrestrial systems or satellite systems; however, in a preferred embodiment, subscriber unit 30 is a dual-use phone that operates with both terrestrial and satellite systems. The modulation format used by subscriber unit 30 is not a limitation of the present invention.

HGW 50 includes home location register (HLR) 55. HLR 55 includes user profile information, and maintains billing information for user 25. Home location registers are well known in the art of global system for mobile telecommunications (GSM). VGW 40 includes visiting location register (VLR) 45. VLR 45 maintains user information while user 25 is roaming in the service area of VGW 40. When a node in communications system 10 retrieves user information, it can come from HLR 55 or VLR 45.

User 25 can access communications system 10 using either base station 35 or one of satellites 15 and 20. For the purposes of authenticating user 25 and subscriber unit 30, the processing within either base station 35 or one of the satellites is substantially the same. Base station 35 is typically a cellular or personal communications system (PCS) transceiver, but can be any other data communications node. The processing will be described with reference to a satellite. When user 25 requests access to communications system 10, subscriber unit 30 transmits to satellite 15 using communications link 70. Subscriber unit 30 is preferably a radio frequency (RF) transmitter. As will be described in more detail below, RF transmitters have unique signatures that can be used for identification. In addition to identification of subscriber unit 30, it is desirable to authenticate user 25. To that end, subscriber unit 30 measures biometric data from user 25 and transmits it to satellite 15. "Biometric" as defined, for example, in U.S. Pat. No. 5,469,506 means a substantially stable physical characteristic of a person which can be automatically measured and characterized for comparison.

The use of biometric information for authentication of users has many advantages. A biometric "ID" can never be lost or stolen because the biometric information is a physical attribute of the holder. Additionally, with advances in technology, biometrics are quickly becoming the most reliable method of user authentication known.

HLR 55 includes a valid user profile for user 25 and subscriber unit 30. The valid user profile includes a datagram representing the RF signature of subscriber unit 30, and biometric information for user 25 as measured by subscriber unit 30. After receiving biometric information from user 25, satellite 15 measures the RF signature of subscriber unit 30. Satellite 15 then sends a message through satellite 20 to HGW 50 retrieving the valid user profile from HLR 55 (or from VLR 45).

In a preferred embodiment, satellite 15 authenticates both user 25 and subscriber unit 30 by comparing biometric information and the RF signature of subscriber unit 30 to the valid user profile obtained from HLR 55. Because both biometric information and RF signatures are subject to statistical variations, a perfect match is seldom made. Accordingly, satellite 15 determines a degree to which user 25 and subscriber unit 30 match a valid user profile, resulting in a probability that the request for access is authentic. The valid user profile also includes a threshold value, which the probability is compared against, to determine authenticity. The methods utilized may be any one of several, including contour distance measure, which is an average summation of differences of each of the parameters; a least mean square (LMS) error; weighted Gaussian density distribution matching; and any other weighted or non-weighted statistical measurement.

Multiple mobile users 25 can be valid users of subscriber unit 30. HLR 55 includes valid user profiles for all valid registered users of subscriber unit 30 as measured by subscriber unit 30 for each user. Satellite 15, when authenticating access, compares the biometric information and RF signature against all valid user profiles included in HLR 55.

User 25 can also access communications system 10 through base station 35. When a call request is made by user 25 through base station 35, base station 35 receives the biometric information and the RF signature of subscriber unit 30. Base station 35 receives a valid user profile from HLR 55 through either communications link 80 or PSTN 60.

Subscriber Unit Authentication

RF transmitters have a unique spectral signature which can be used to distinguish one unit from another. The method and apparatus of the present invention utilizes this unique signature to distinguish legitimate subscriber units from fraudulent subscriber units in communications system 10. The technique of identifying transmitters using RF signatures is not new in the art, and has been previously used in military and intelligence applications. An example of an apparatus for characterizing a radio transmitter can be found in U.S. Pat. No. 5,005,210 issued Apr. 2, 1991, the contents of which are hereby incorporated by reference.

Despite good engineering design practices, all RF transmitters will transmit undesired signal components at frequencies within, and out of, a given bandwidth. These unwanted components originate in a variety of places in the transmission chain. For example, amplifier non-linearities, particularly in the output power amplifiers, produce harmonics and intermodulation distortion (IMD). Crystals used in oscillators in the RF unit also produce unique, non-zero sub-harmonics. Mixers further compound the production of undesired mixing and spurious responses. Since each transmitter is a unique combination of elements which produce a unique combination of these undesired spurs, harmonics, and IMDs, this information can be measured and used to identify and authenticate the particular RF transmitter.

Measurable RF characteristics unique to each transmitter go beyond the aforementioned spurious spectral content. Examples include, but are not limited to, turn on transmitting amplitude, frequency or phase modulation versus time, the time between turn on and onset of data, phase and frequency modulation during that delay, the initial amplitude, phase and frequency modulation when data transmission starts, transmission bit times, total times, timing jitter, rise and fall timing, carrier turn off time, modulation deviation and distortion, modulation phase, bit to bit modulation variations, demodulation spectrum, spurious transmitter data, etc. Some or all of these various characteristics can be used by communications system 10 for authentication of subscriber unit 30.

User Authentication

The method and apparatus of the present invention uses biometric information describing user 25 to authenticate access. Biometric information used to authenticate access can consist of retinal eye scan data, iris eye scan data, fingerprint data, voice print data, palm pressure print data, facial thermography, or any other data that represents a unique feature of an individual user.

Biometric information used to authenticate access can include retinal eye scan data, which is a mapping of the retinal blood vessels of the human eye. Research suggests that no two human eyes share the same pattern of blood vessels. A retinal eye scan is typically performed by shining an infrared light through the pupil to the back of the eye. The results are recorded for comparison with known valid data previously collected from the authentic user. Because retinal eye scan data is unique to each user, this leads to very robust authentication methods.

The use of a retinal eye scanner is advantageous because a retinal eyescan of user 25 provides a highly reliable authentication through the use of unique characteristic of each user 25. When retinal eyescan data is used, subscriber unit 30 includes a retinal eyescanner. When placing a call, user 25 places subscriber unit 30 such that a retinal eyescan is performed, and the retinal eyescan data is transmitted to satellite 15. Biometric information can also include voice print data, such as vocoder coefficients generated by subscriber unit 30 when user 25 speaks a standard phrase into subscriber unit 30. Of course, other voice print data such as a digitized sample could also be used.

Biometric information can also include other user specific information such as fingerprint data, retinal eyescan data, or palm pressure print data. When fingerprint data is used, subscriber unit 30 includes a fingerprint sensor that measures a fingerprint of user 25 when a call is placed. The fingerprint sensor of subscriber unit 30 is preferably integrated into the surface of a key on the keypad of subscriber unit 30. For example, the star key or the pound key, when pressed, can measure the fingerprint of user 25.

Figure 2:
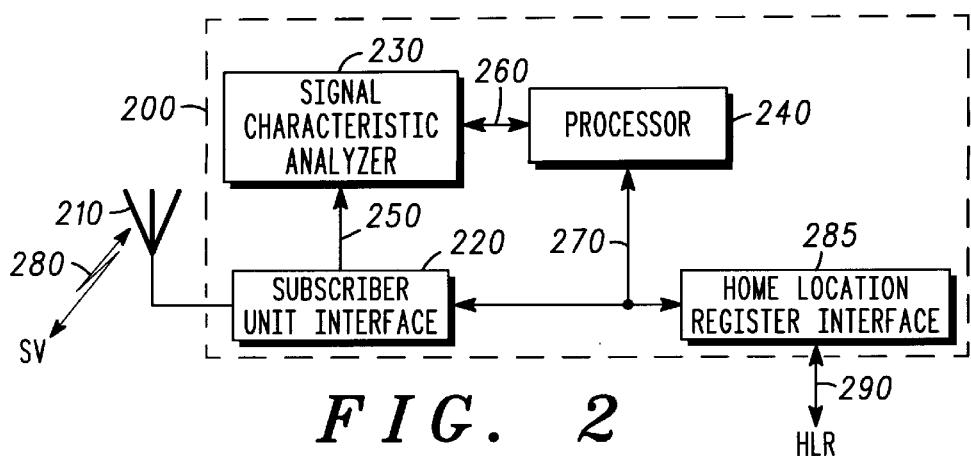
FIG. 2 shows a diagram of a node in a communications system in accordance with a preferred embodiment of the present invention.

FIG. 2 shows a diagram of a node in a communications system in accordance with a preferred embodiment of the present invention. Node 200 is preferably included in base station 35 (FIG. 1) or in one of satellites 15 and 20 (FIG. 1); however, node 200 can-exist elsewhere within communications system 10. Node 200 includes subscriber unit interface 220, signal characteristic analyzer 230, processor 240, and home location register interface 285. Subscriber unit interface 220 is typically a transceiver capable of communicating with a subscriber unit through an antenna 210. When node 200 is included within a satellite, antenna 210 is an antenna pointed at the ground for communication with a subscriber unit via communications link 280. When node 200 is included within a base station, antenna 210 is typically an antenna on a tower capable of communicating with a subscriber unit via communications link 280.

Signal characteristic analyzer 230 is coupled to subscriber unit interface 220 via signal 250. Signal 250 can be identical to the signal received by subscriber unit interface 220; however, signal 250 can also have undergone amplification, frequency translation, or other suitable modifications. Signal characteristic analyzer 230 measures the RF signature of the subscriber unit communicating with node 200. When the RF signature includes spurious spectral content as described above, signal characteristic analyzer 230 includes a spectrum analyzer. Signal characteristic analyzer 230 can also include other measurement devices capable of measuring other aspects of the RP signature. For example, signal characteristic analyzer 230 typically includes instantaneous frequency modulation (IFM) measurement hardware, phase measurement hardware, and timing measurement hardware. Signal characteristic analyzer 230 produces a datagram on signal 260 which represents the RF signature of a subscriber communicating with node 200.

Processor 240 receives the RF signature datagram on signal 260, and receives other data from subscriber unit interface 220 on signal 270. Signal 270 is preferably many signals, representative of a processor's control bus. This can include, for example, address lines, data lines, and control lines. Processor 240 also receives information from home location register interface 285.

Home location register interface 285 communicates with a home location register via link 290. Processor 240 receives user profiles from a home location register via home location register interface 285 and signal 270. Processor 240 compares the RF signature received on signal 260, and the user's biometric information received from subscriber unit interface 220 on signal 270, with a valid user profile retrieved from a home location register. When a match is made, processor 240 allows the subscriber unit and the user to communicate in communications system 10 (FIG. 1). On the other hand, when processor 240 finds no match, access to communications system 10 (FIG. 1) is denied.

When node 200 is included in a satellite, subscriber unit interface 220 is typically a transceiver, and home location register interface 285 is also typically a transceiver. In a preferred embodiment, the transceiver used for subscriber unit interface 220 is the same transceiver used for home location register interface 285. In this case, link 290 is an RF link to a gateway that can retrieve information from a home location register. In an alternate embodiment, node 200 is included within a base station. In this case, subscriber unit interface 220 is typically a transceiver, home location register interface 285 is typically a wireline interface, and link 290 is part of a terrestrial wireline network capable of communicating with a gateway. For example, link 290 can be part of PSTN 60 (FIG. 1).

In an alternate embodiment, processing resources on a satellite are reduced by off-loading some of the above stated functionality to a base station. For example, a satellite can measure the RF signature of a subscriber unit, but not make the comparison with the user profile retrieved from a home location register. In this embodiment, processor 240 retrieves the RF signature from signal characteristic analyzer 230, retrieves the biometric information from subscriber unit interface 220, and sends them both to a ground station via home location register interface 285. Typically, this information will be received by a gateway or a base station where the comparison with a valid user profile takes place. This embodiment is advantageous in communications systems employing "bent pipes" in the satellites. Systems employing bent pipes typically do not include excess processing power in the satellites, so off-loading tasks is advantageous.

In another alternate embodiment, processor resources on a satellite are advantageously reduced by off-loading functionality other than that previously stated. For example, a base station can include signal characteristic analyzer 230 so that when a subscriber unit is communicating with the base station, the base station measures the RF signature of the subscriber unit. The comparison can then be performed at the base station or at a satellite. One skilled in the art will appreciate that the different functions can be distributed in the system in a multitude of advantageous ways.

Figure 3:
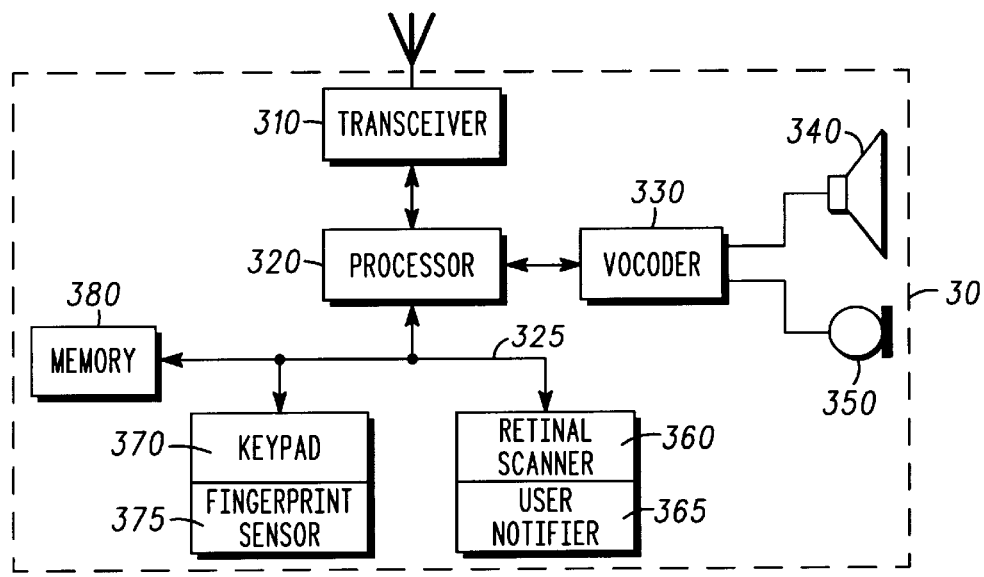
FIG. 3 shows a diagram of a subscriber unit in accordance with a preferred embodiment of the present invention.

FIG. 3 shows a diagram of a subscriber unit in accordance with a preferred embodiment of the present invention. Subscriber unit 30 includes transceiver 310, processor 320, memory 380, vocoder 330, speaker 340, microphone 350, keypad 370, fingerprint sensor 375, retinal scanner 360, and user notifier 365. Processor 320 is coupled to memory 380 via control bus 325. Processor 320 is also coupled to keypad 370, fingerprint sensor 375, retinal scanner 360, vocoder 330, and user notifier 365 via control bus 325.

A user operating subscriber unit 30 operates keypad 370 when making a call. In a preferred embodiment, fingerprint sensor 375 is integral with keypad 370. For example, fingerprint sensor 375 is preferably part of a key, such as the star key or the pound key, so that a fingerprint may be measured while the user operates keypad 370. The resulting fingerprint data is formatted by processor 320 to be transmitted by transceiver 310 as biometric information describing the user.

Retinal scanner 360, like fingerprint sensor 375, is also a biometric measuring device that measures a biometric which describes the user. Retinal scanner 360 scans the retina of the user and sends the retinal scan data to processor 320 to be formatted for transmission by transceiver 310. User notifier 365 is preferably a part of retinal scanner 360 and notifies the user when the retinal scan is complete. User notifier 365 also provides feedback to the user during the retinal scan so that the retinal scan is performed correctly.

Microphone 350 receives speech from the user, and vocoder 330 generates coefficients to be formatted by processor 320 and transmitted by transceiver 310. Vocoder 330 is also coupled to speaker 340 so that the user can receive audible information received by transceiver 310. Subscriber unit 30, as shown in FIG. 3, includes three of the many different possible biometric sensors: fingerprint sensor 375, retinal scanner 360, and vocoder 330. The number of biometric sensors is not a limitation of the present invention. For example, fingerprint sensor 375 can be included, where retinal scanner 360 is not. Likewise, subscriber unit 30 may include retinal scanner 360 and not fingerprint sensor 375. In an alternate embodiment, subscriber unit 30 includes neither fingerprint sensor 375 nor retinal scanner 360, but instead includes a palm pressure print sensor or a facial thermographer. One skilled in the art will appreciate that still other types of biometric sensors may be included while still practicing the present invention.

Processor 320 receives biometric information from other subsystems included within subscriber unit 30, and formats them for transmission by transceiver 310. Transceiver 310 receives the formatted biometric information from processor 320 and prepares it for transmission at RF frequencies. The functions of transceiver 310 can include, but are not limited to, modulation, frequency conversion, and amplification. As a result, transceiver 310 transmits a signal which has distinguishable characteristics.

Subscriber unit 30 has many advantages. By measuring biometric information describing the current user, subscriber unit 30 provides communications system 10 (FIG. 1) with the ability to robustly authenticate the user. In addition, subscriber unit 30 transmits an RF signature to communications system 10 (FIG. 1) which allows the system to authenticate subscriber unit 30. After subscriber unit 30 transmits biometric information describing the user, and an RF signature describing the subscriber unit, communication system 10 (FIG. 1) transmits information back to subscriber unit 30 granting access. If, however, a pirate is using subscriber unit 30, the biometric information measured by subscriber unit 30 will not match the valid biometric information, and communications system 10 (FIG. 1) will transmit information back to subscriber unit 30 denying access.

Figure 4:
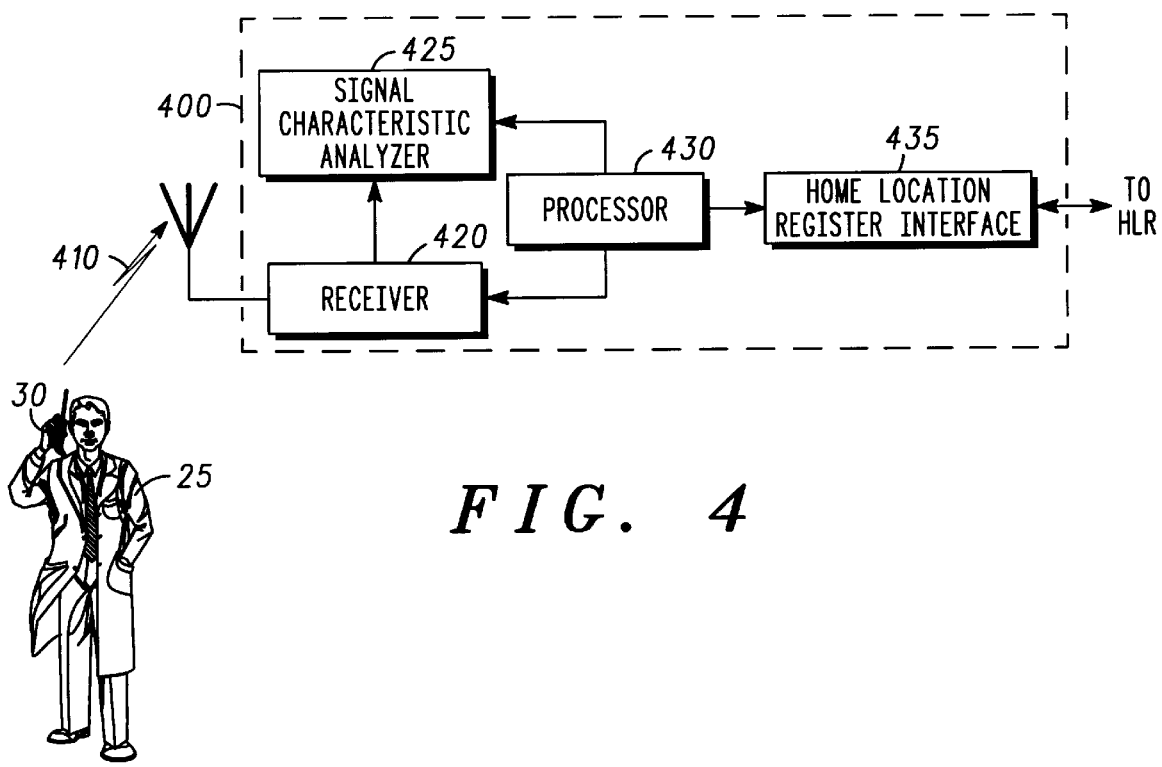
FIG. 4 shows a diagram of a test set in accordance with a preferred embodiment of the present invention.

FIG. 4 shows a diagram of a test set in accordance with a preferred embodiment of the present invention. Test set 400 is used to generate the valid user profiles which are stored in the home location register. When a new user registers with communications system 10 (FIG. 1), his biometric information is measured along with the RF signature of his subscriber unit, and the result is stored in the home location register.

Test set 400 includes receiver 420, signal characteristic analyzer 425, processor 430, and HLR interface 435. The functional blocks described with reference to test set 400 operate analogously to the corresponding functional blocks of node 200 (FIG. 2), with the exception that rather than authenticating access, test set 400 generates the known valid user profile.

In operation, user 25 operates subscriber unit 30, and the resulting signal 410 includes the measured biometric information and the RF signature of subscriber unit 30. Receiver 420 receives signal 410 and routes it to signal characteristic analyzer 425. Signal characteristic analyzer 425 measures the RF signature of signal 410 and provides a datagram describing the RF signature to processor 430. Likewise, receiver 420 provides the biometric information to processor 430. Processor 430 formats the RF signature and the biometric information into a valid user profile that is sent to HLR interface 435. HLR interface 435 stores the valid user profile in the HLR for retrieval later when user 25 and subscriber unit 30 need to be authenticated.

FIG. 4 shows a single user 25 with a single subscriber unit 30 being registered. In a preferred embodiment, multiple users 25 can be registered for use with a single subscriber unit 30. This allows a number of people to be registered for use of a single subscriber unit. When multiple users 25 are registered for use of subscriber unit 30, test set 400 runs the test at least once for each user 25.

Figure 5:
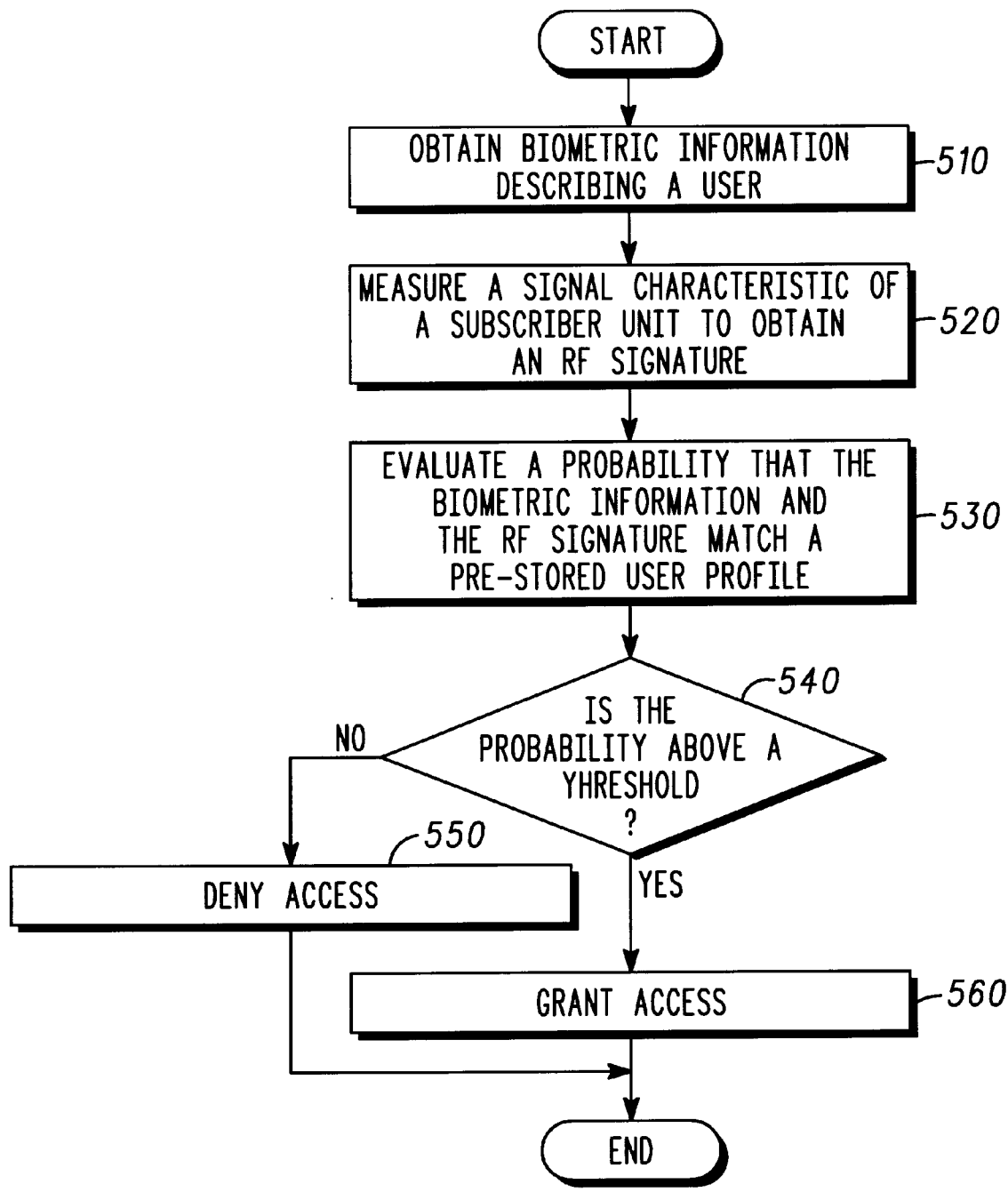
FIG. 5 shows a flowchart of a method of authenticating a user and a subscriber unit in a communications system in accordance with a preferred embodiment of the present invention.

FIG. 5 shows a flow chart of a method of authenticating a user and a subscriber unit in a communications system in accordance with a preferred embodiment of the present invention. Method 500 begins with step 510 when biometric information is obtained describing a user. The biometric information of step 510 can be fingerprint information, retinal eyescan information, voiceprint information, or any other information describing the user. In step 520, a signal characteristic of a subscriber unit is measured to obtain an RF signature. The RF signature obtained in step 520 identifies, to the greatest extent possible, the subscriber unit being used by the user.

In step 530, a probability is evaluated that the biometric information and the RF signature match a prestored user profile. The pre-stored user profile of step 530 preferably includes a threshold, above which the probability will signify a match, and below which the probability will indicate a non-match. In step 540, the probability is compared against the threshold. If the probability is above the threshold, processing proceeds with step 560 where access is granted. On the other hand, if the probability is below the threshold, processing proceeds with step 550 where access is denied. After either step 550 or 560, the authentication process is complete and method 500 ends.

The steps of method 500 as just described, can be performed in a single node of a communications system, or can be performed in a distributed fashion among multiple nodes of a communications system. For example, a portion of method 500 can be performed in a satellite, such as steps 510 and 520, with the remaining steps performed in a gateway. In another example embodiment, all of the steps in method 500 are performed in a base station, such as base station 35 in communications system 10 (FIG. 1).

Figure 6:
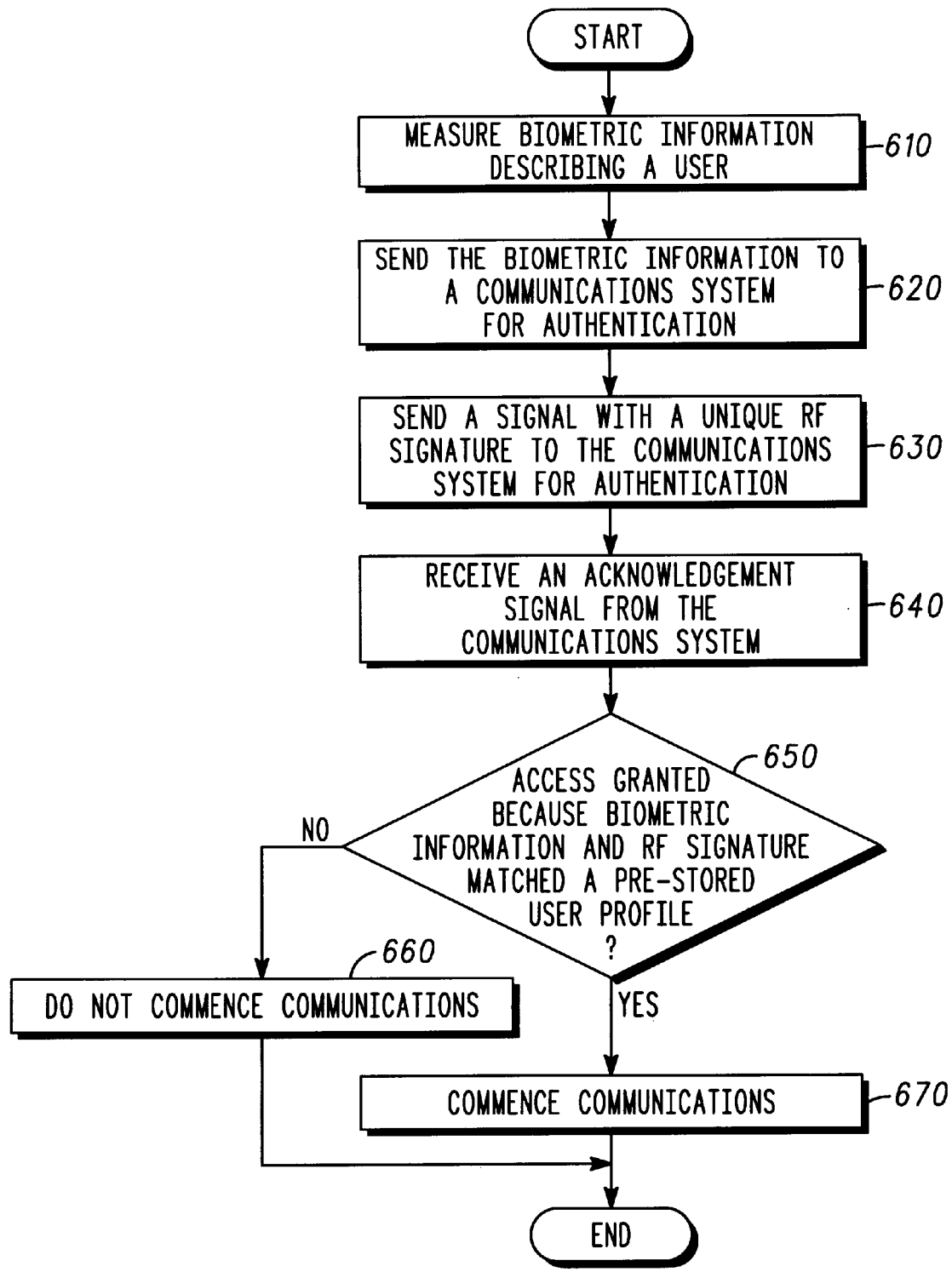
FIG. 6 shows a flowchart of a method of operating a subscriber unit in a communications system in accordance with a preferred embodiment of the present invention.

FIG. 6 shows a flowchart of a method of operating a subscriber unit in a communications system in accordance with a preferred embodiment of the present invention. Method 600 begins with step 610 when biometric information is measured which describes a user. After the biometric information is measured in step 610, the biometric information is formatted and sent to a communications system for authentication in step 620. In step 630, a signal with a unique RF signature is sent to the communications system for authentication. The signal with a unique RF signature of step 630 can be the signal which includes the biometric information of step 620, or can be a separate signal. Then, in step 640, an acknowledgment signal is received from the communications system. After receiving the acknowledgment signal in step 640, processing proceeds with step 650. If, in step 650, access has been granted because the biometric information and the RF signature matched a pre-stored user profile, then processing proceeds with step 670 where communications are commenced. Otherwise, processing proceeds with step 660 where communications are not commenced. At the completion of either step 660 or step 670, method 600 is complete, and processing ends.

Figure 7:
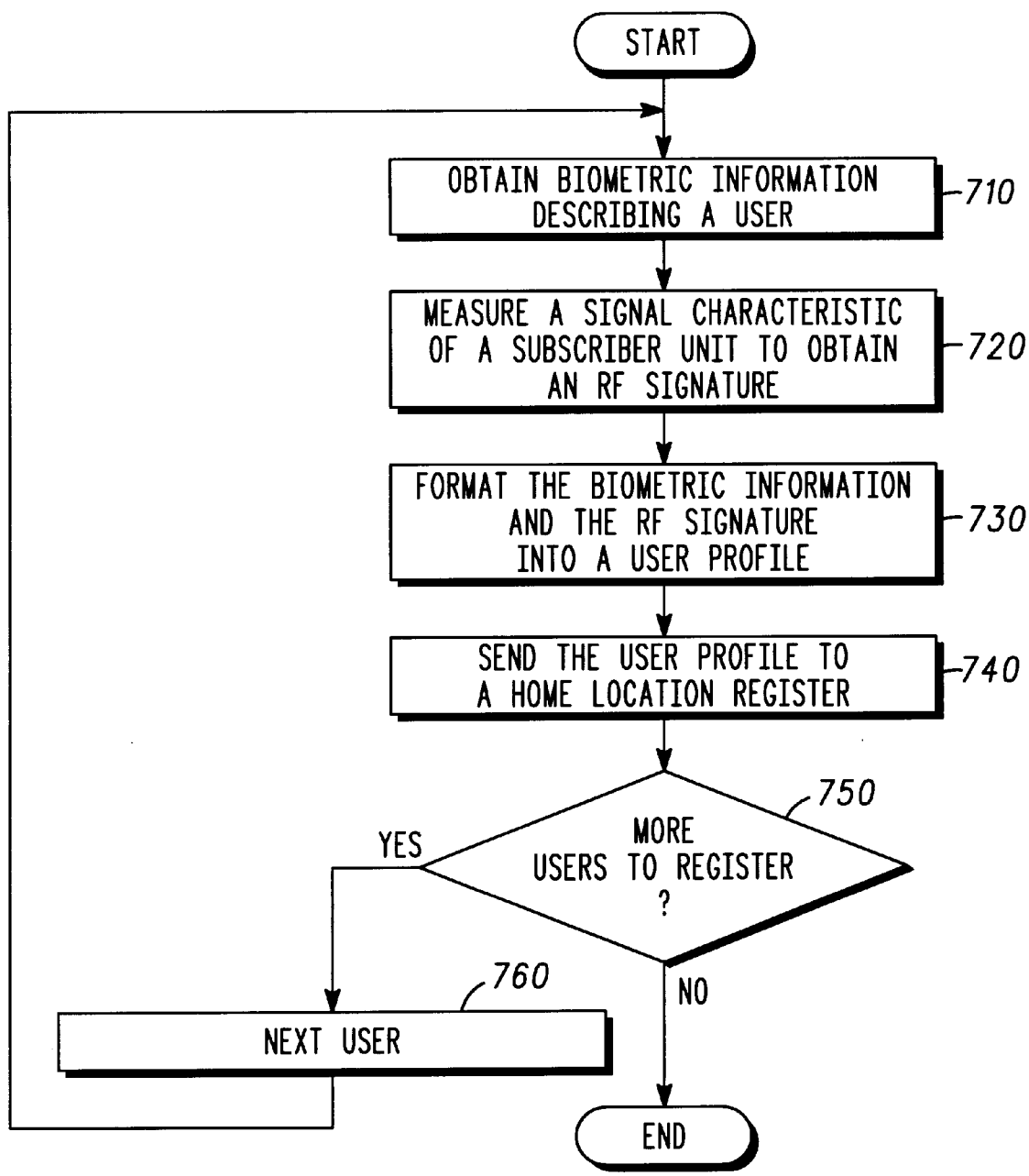
FIG. 7 shows a flowchart of a method of operating a test set in a communications system in accordance with a preferred embodiment of the present invention.

FIG. 7 shows a flowchart of a method of operating a test set in a communications system in accordance with a preferred embodiment of the present invention. Method 700 as shown in FIG. 7 is a method of generating the prestored user profiles previously described. When a user or a plurality of users are to be registered as valid users of a subscriber unit, method 700 is utilized in conjunction with the test set of FIG. 4 to generate valid user profiles to be stored in the home location register.

Method 700 begins with step 710 when biometric information is obtained describing a user. In step 720, a signal characteristic of a subscriber unit is measured to obtain an RF signature. The signal of 720 may be the signal which transmitted the biometric information of step 710, but this is not a limitation of the present invention. For example, a separate signal may be transmitted from a subscriber unit for the purposes of measuring the RF signature. In step 730, the biometric information and the RF signature are formatted into a user profile. The user profile of step 730 includes information which describes a valid user in conjunction with a valid subscriber unit. In step 740, the user profile is sent to a home location register. If, in step 750, there are more users to be registered, then processing proceeds with step 760 where the next user is substituted for the present user. After step 760, steps 710 through 740 of method of 700 are repeated for the next user. When there are no more users to be registered, processing ends after step 750.

Although method 700 describes a preferred embodiment where each separate user profile is sent to a home location register separately in step 740, other embodiments exist where the user profiles are not sent to the home location register until all user profiles for all valid users have been generated.

Method 700 is typically performed when a new subscriber unit is issued to a user or a number of users, or after a subscriber unit undergoes service which may cause the RF signature to change. Method 700 can also be performed periodically to take into account any changes occurring over time which affect either biometric information or RF signatures.

In summary, the method and apparatus of the present invention provides an advantageous means for authenticating subscriber units and users in a communications system. While we have shown and described specific embodiments of the present invention, further modifications and improvements will occur to those skilled in the art. For example, the specific embodiments described pertain mainly to telephony systems, but the method and apparatus of the present invention also apply to wideband systems, paging systems, and other data delivery services. We desire it to be understood, therefore, that this invention is not limited to the particular forms shown and we intend in the appended claims to cover all modifications that do not depart from the spirit and scope of this invention.

What is claimed is:

1. A communications system comprising:
   at least one subscriber unit associated with a biometric sensor for measuring biometric information of a user
   a transmitter capable of transmitting a signal with a unique signature of said at least one subscriber unit;
   a register which has a pre-stored user profile including a valid signature and valid biometric information;
   a communications node which receives said biometric information and said signal from the at least one subscriber unit and receives said pre-stored user profile from said register, said communication node evaluating a probability that said biometric information and said unique signature substantially match said pre-stored user profile and providing access to said user if said probability is greater than a threshold and denying access to said user if said probability is less than a threshold.

2. A user authentication apparatus in a communications system, said user authentication apparatus comprising:
   a subscriber unit having:
      a biometric sensor for measuring biometric information of a user;
      a processor in communication with said biometric sensor, said processor formatting said biometric information and producing formatted biometric information; and
      a transmitter in communication with processor, said transmitter receiving said formatted biometric information and preparing said formatted biometric information for transmission as a signal having said biometric information;
   a communication node receiving said signal and a pre-stored user profile and said signal, said communication node evaluating a probability that said signal having said biometric information substantially matches said pre-stored user profile and authenticating access of said user if said probability is greater than a threshold and failing to authenticate access of said user if said probability is less than a threshold.

3. The user authentication apparatus of claim 2 wherein said biometric sensor is a fingerprint measuring device.

4. The user authentication apparatus of claim 3, wherein said fingerprint measuring device is integrated into at least one button of a keypad.

5. The user authentication apparatus of claim 2 wherein said biometric sensor is a retinal eye scanner.

6. The user authentication apparatus of claim 2 wherein said biometric sensor is a vocoder.

7. The user authentication apparatus of claim 2 wherein said signal includes a unique RF signature.

8. The user authentication apparatus of claim 2 further comprising a receiver for receiving an authentication message generated in response to said communication node evaluating a probability that said signal having said biometric information substantially matches said pre-stored user profile.

9. The user authentication apparatus of claim 2 wherein said biometric sensor is a facial thermographer.

10. A method of authenticating access for a user of a subscriber unit in a communications system, said method comprising the steps of:
    obtaining biometric information of said user;
    measuring a signal characteristic of said subscriber unit to obtain a signature;
    comparing said biometric information and said signature against a pre-stored user profile;
    evaluating a probability that said biometric information and said signature substantially match said pre-stored user profile;
    providing access to said communications system if said probability is above a threshold; and
    denying access to said communications system if said probability is below said threshold.

11. The method of claim 10 wherein said biometric information includes voice print data.

12. The method of claim 11 wherein said voice print data includes vocoder coefficients.

13. The method of claim 10 wherein said biometric information includes fingerprint data.

14. The method of claim 10 wherein said biometric information includes retinal eye scan data.

* * * * *